Dec. 13, 1966          M. S. DE LAY          3,291,503
AUTOMATICALLY STEERABLE TRAILER
Filed Nov. 12, 1964                     11 Sheets-Sheet 1

INVENTOR.
MANFORD S. DE LAY
BY Alfred W Petchaft
ATTORNEY

Dec. 13, 1966 M. S. DE LAY 3,291,503
AUTOMATICALLY STEERABLE TRAILER
Filed Nov. 12, 1964 11 Sheets-Sheet 2

INVENTOR.
MANFORD S. DE LAY
BY
ATTORNEY

Dec. 13, 1966    M. S. DE LAY    3,291,503
AUTOMATICALLY STEERABLE TRAILER
Filed Nov. 12, 1964    11 Sheets-Sheet 3

INVENTOR.
MANFORD S. DE LAY
BY
ATTORNEY

Dec. 13, 1966          M. S. DE LAY          3,291,503

AUTOMATICALLY STEERABLE TRAILER

Filed Nov. 12, 1964          11 Sheets-Sheet 4

INVENTOR.
MANFORD S. DE LAY
BY
*Alfred W Hitchcraft*
ATTORNEY

Dec. 13, 1966   M. S. DE LAY   3,291,503
AUTOMATICALLY STEERABLE TRAILER
Filed Nov. 12, 1964   11 Sheets-Sheet 6

INVENTOR.
MANFORD S. DE LAY
BY
ATTORNEY

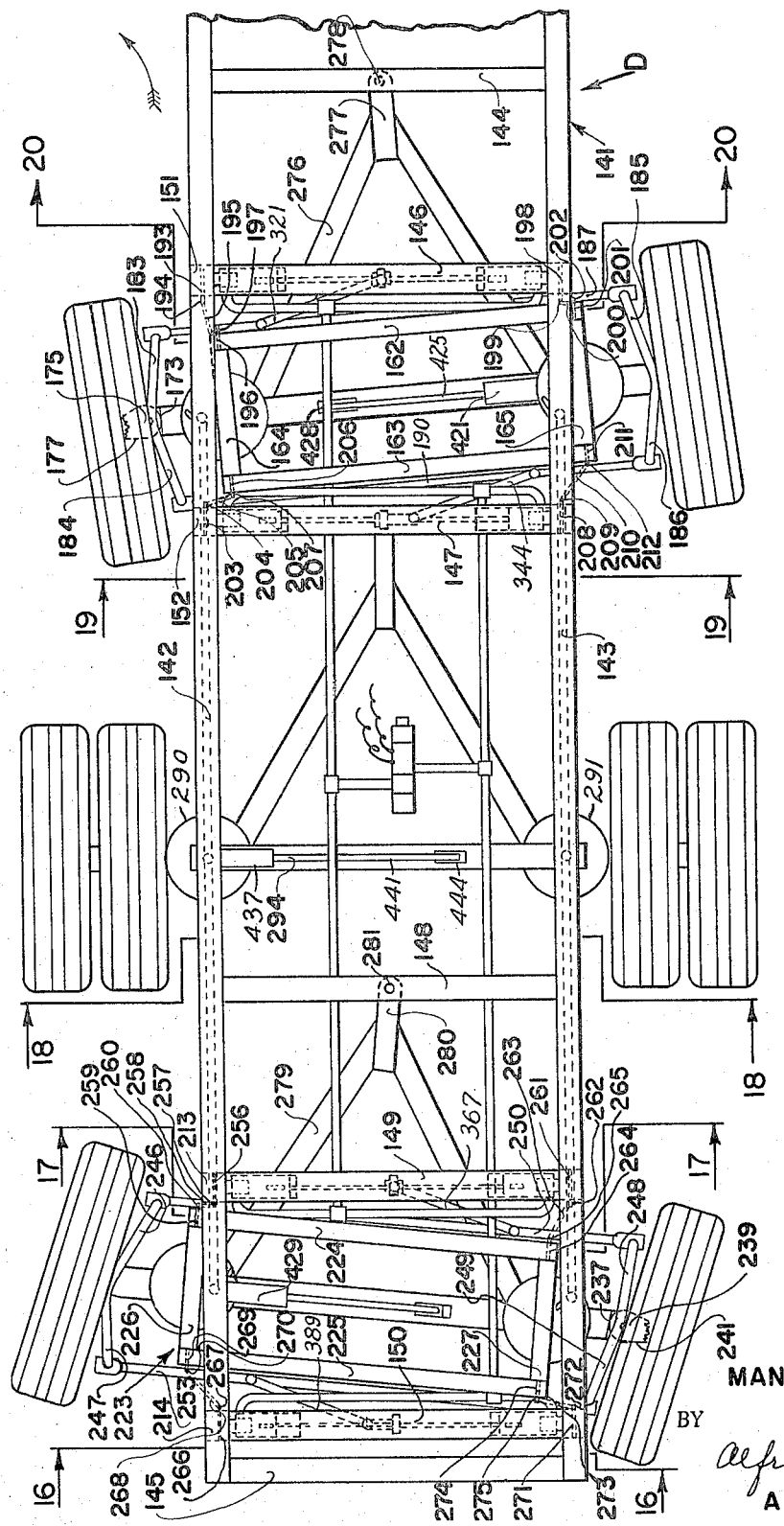

Dec. 13, 1966  M. S. DE LAY  3,291,503
AUTOMATICALLY STEERABLE TRAILER
Filed Nov. 12, 1964  11 Sheets-Sheet 8
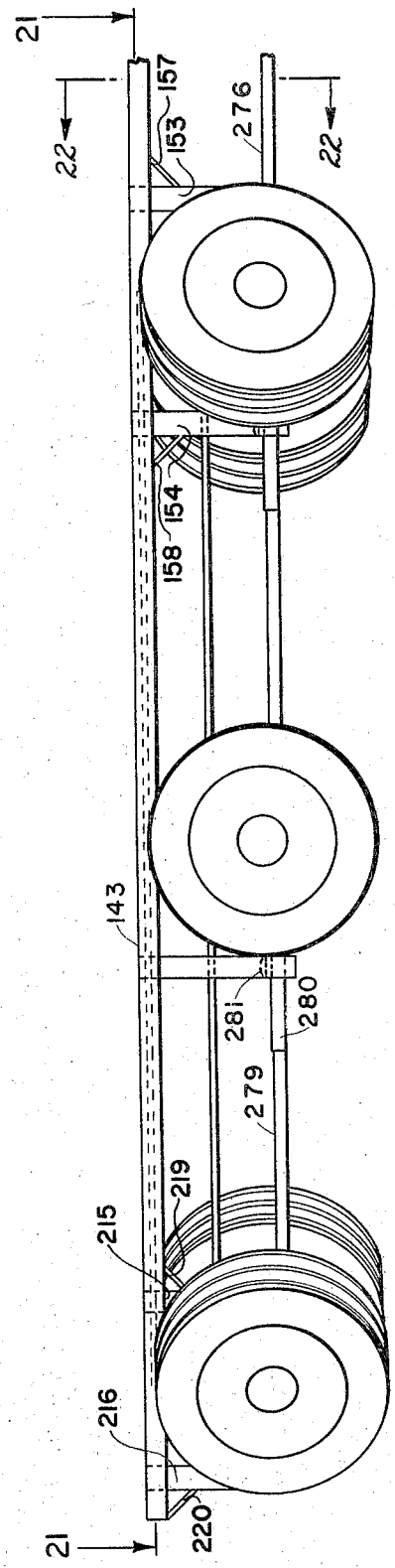
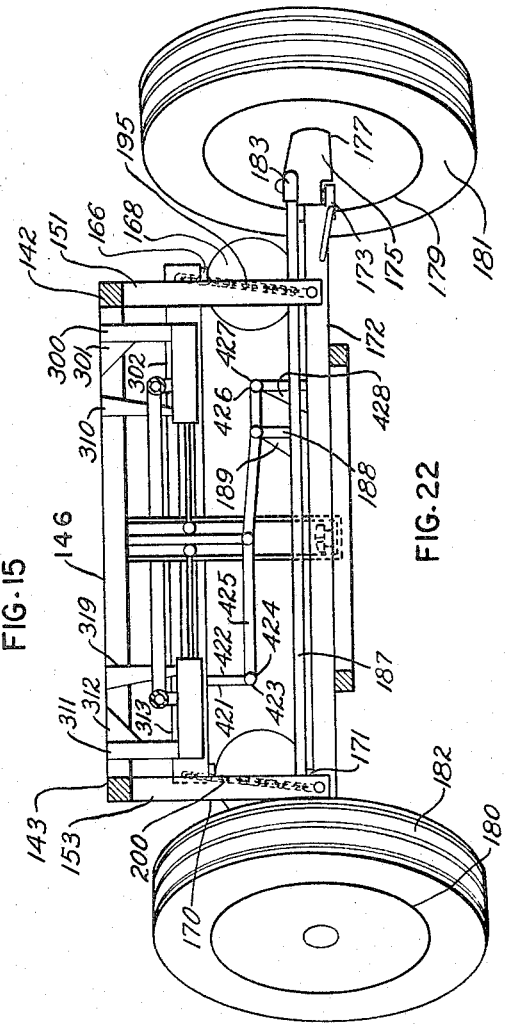
INVENTOR.
MANFORD S. DE LAY
BY
ATTORNEY Dec. 13, 1966   M. S. DE LAY   3,291,503
AUTOMATICALLY STEERABLE TRAILER
Filed Nov. 12, 1964   11 Sheets-Sheet 9

INVENTOR.
MANFORD S. DE LAY
BY
*Alfred W. Petchaft*
ATTORNEY

Dec. 13, 1966  M. S. DE LAY  3,291,503
AUTOMATICALLY STEERABLE TRAILER
Filed Nov. 12, 1964  11 Sheets-Sheet 10
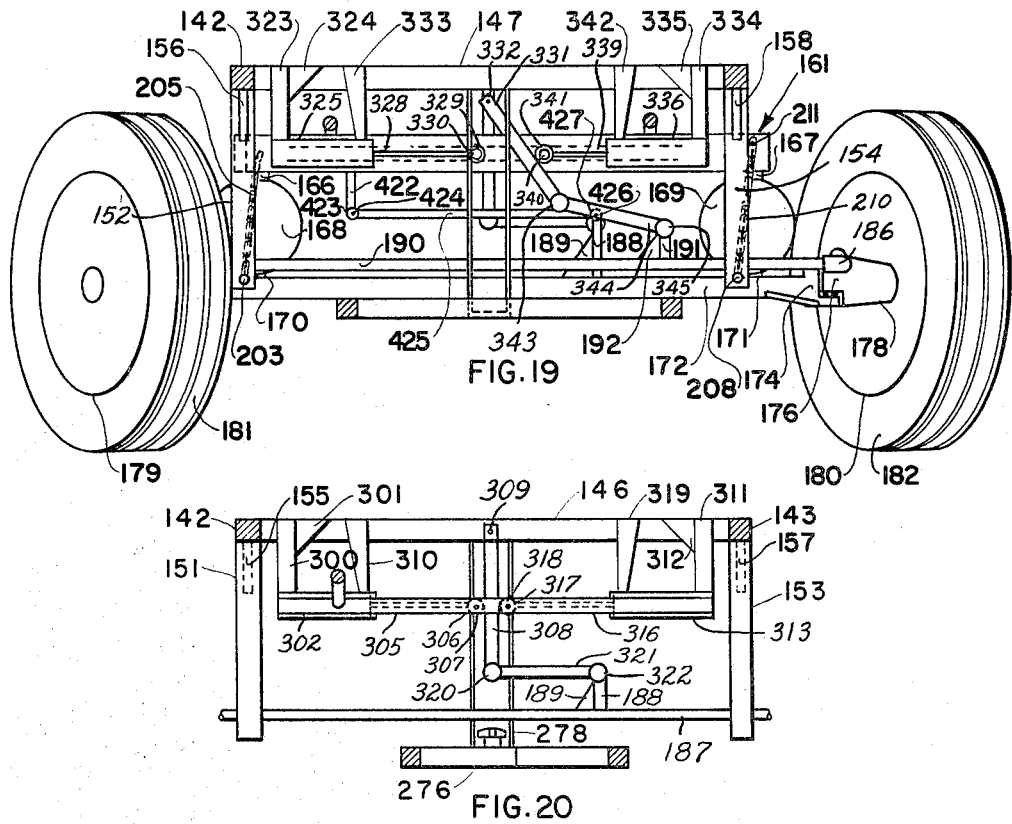
FIG. 19
FIG. 20
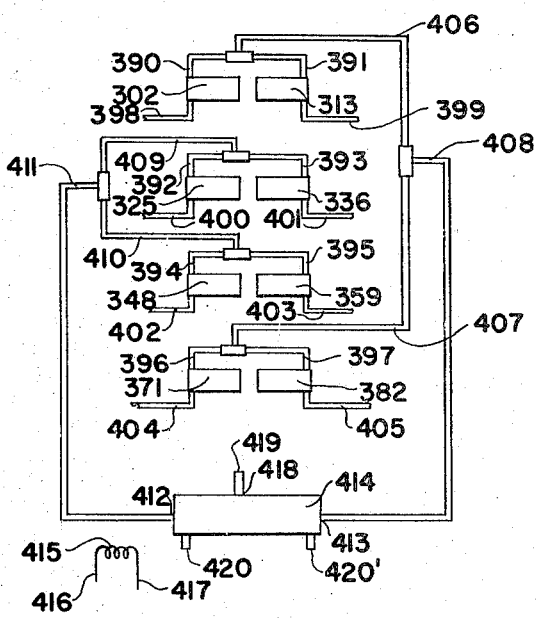
FIG. 23
INVENTOR.
MANFORD S. DE LAY
BY
Alfred W Petchaft
ATTORNEY

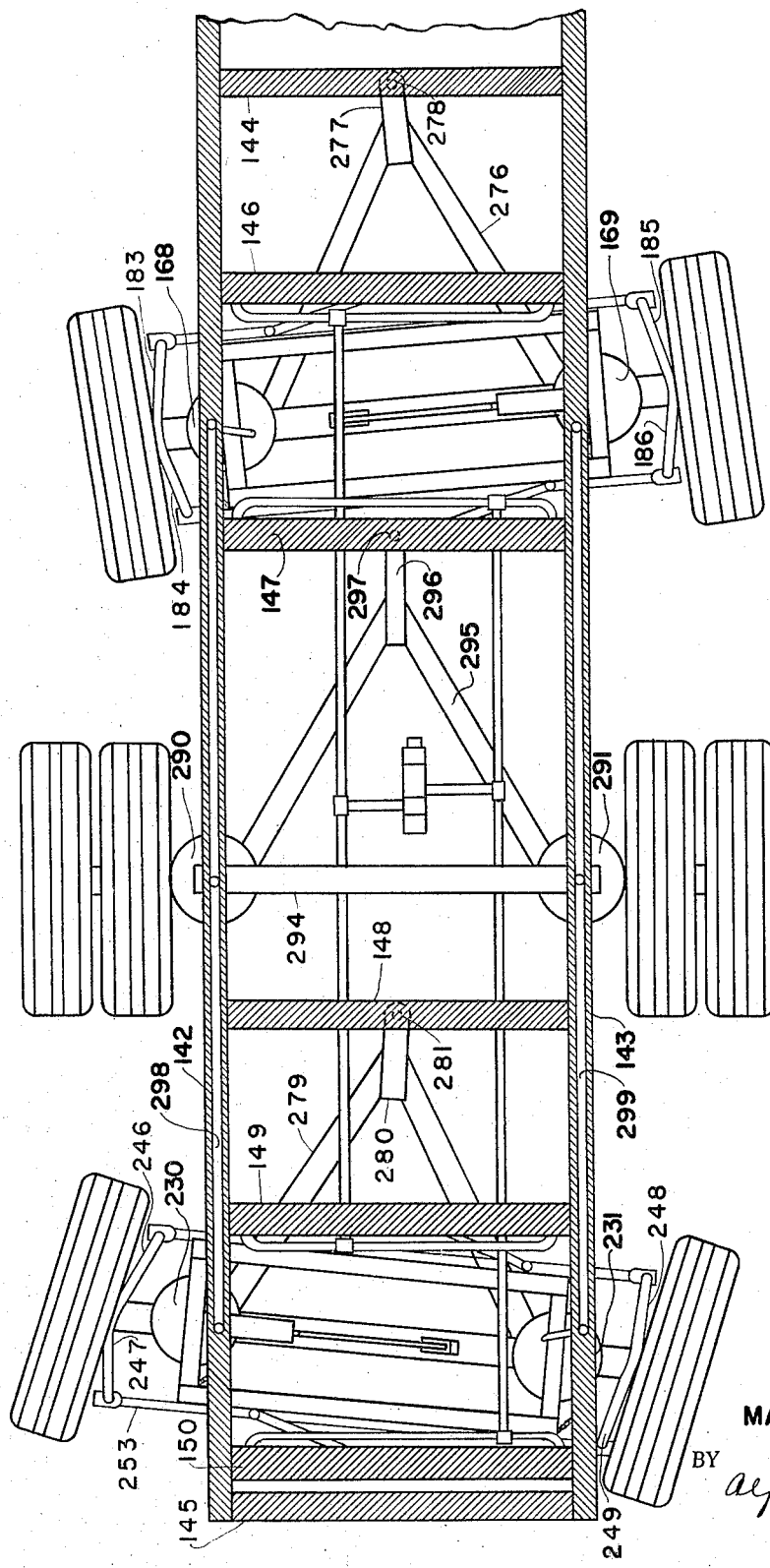

United States Patent Office 3,291,503
Patented Dec. 13, 1966

3,291,503
AUTOMATICALLY STEERABLE TRAILER
Manford S. De Lay, 2117 Gravois Ave.,
St. Louis County, Mo.
Filed Nov. 12, 1964, Ser. No. 410,646
15 Claims. (Cl. 280—81)

This invention relates in general to vehicular trailers and, more particularly, to an automatically steerable trailer which is attached to and drawn by a principal vehicle, such as an automobile, automotive tractor, or the like.

At the present time, many types of trailers are in use and are adapted to be drawn by some form of principal vehicle. Some such devices are relatively small and are connected, by some form of so-called "hitch," to the rear of a passenger automobile. In the trucking industry, a wide variety of truck-bodies or so-called "boxes" are mounted upon different types of tandem wheels and are connected by fifth wheel devices to the rear of automotive tractors for freight hauling purposes. In all types of trailers, the wheels are mounted upon fixed spindles or solid axles and do not swing steerably about vertical axes, but, rather, track differentially around behind the principal vehicle very much in the manner of the rear wheels of a wagon. As a result, there is excessive wear on the trailer tires and there is an ever-present danger of "jack-knifing."

It is, therefore, the primary object of the present invention to provide a trailer having steerable wheels which swing about appropriate upright axes so as to track properly behind a principal vehicle during turns both in the forward-going as well as the rearward-going direction.

It is another object of the present invention to provide a trailer of the type stated which is automatically steerable and has wheels which will swing in the proper direction and to the proper degree automatically in response to the inertial and other forces imposed thereon by turning.

It is also an object of the present invention to provide an automatically steerable trailer which is simple and economical in construction.

It is a further object of the present invention to provide a trailer of the type stated which will operate effectively both during forward-going turns as well as rearward-going turns and can be switched from a forward-turn responsive configuration to a rearward-turn responsive configuration by suitable control means.

With the above and other objects in view, my invention resides in the novel features of form, construction, arrangement, and combination of parts presently described and pointed out in the claims.

In the accompanying drawings.

Figure 1:
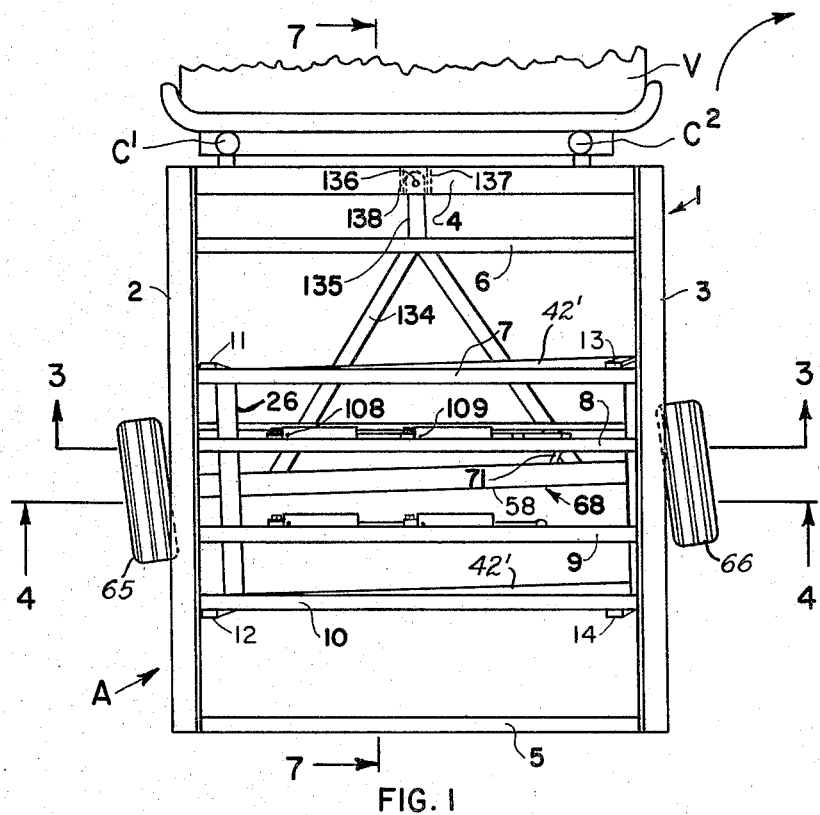
FIG. 1 is a top plan view of a vehicular trailer constructed in accordance with and embodying the present invention.
Figure 3:
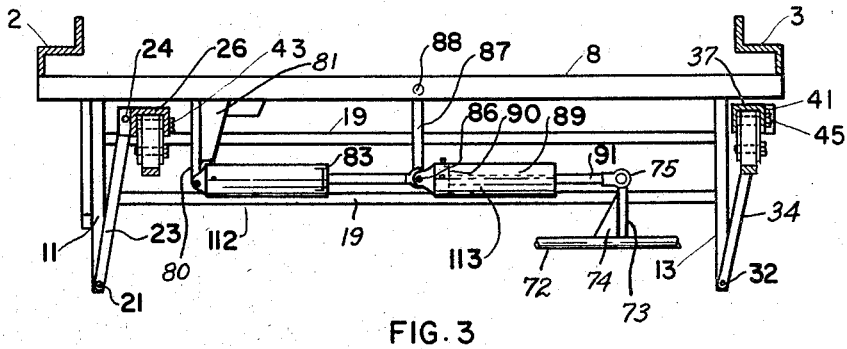
Figure 4:
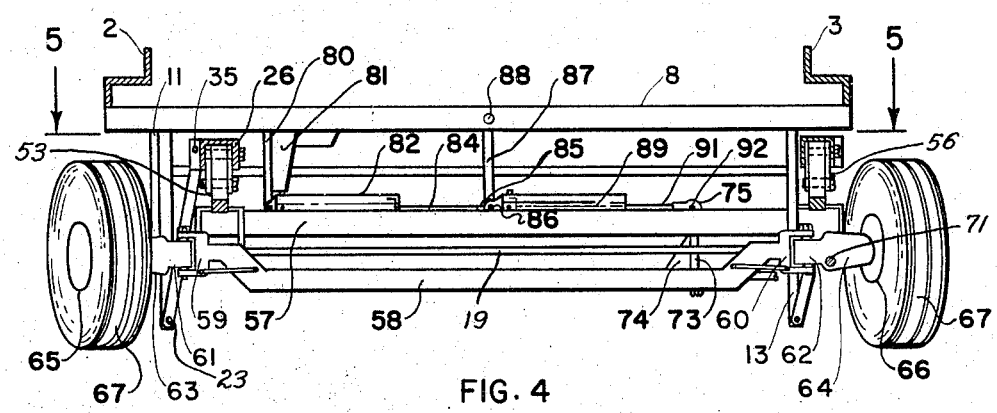
Figure 5:
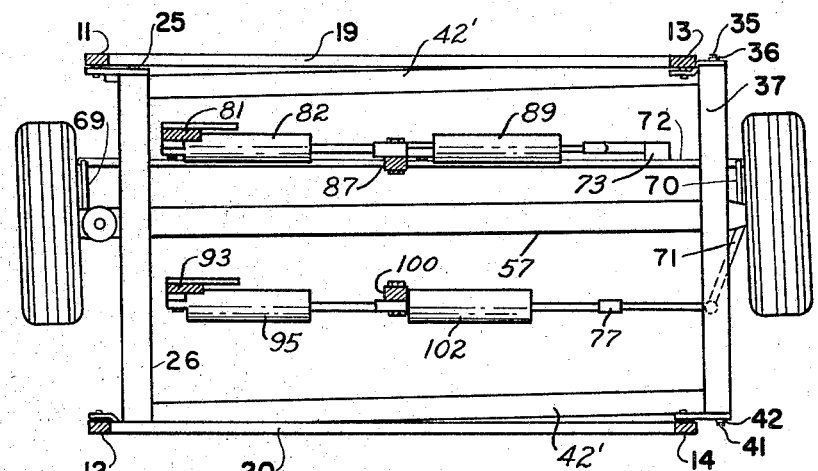
Figure 6:
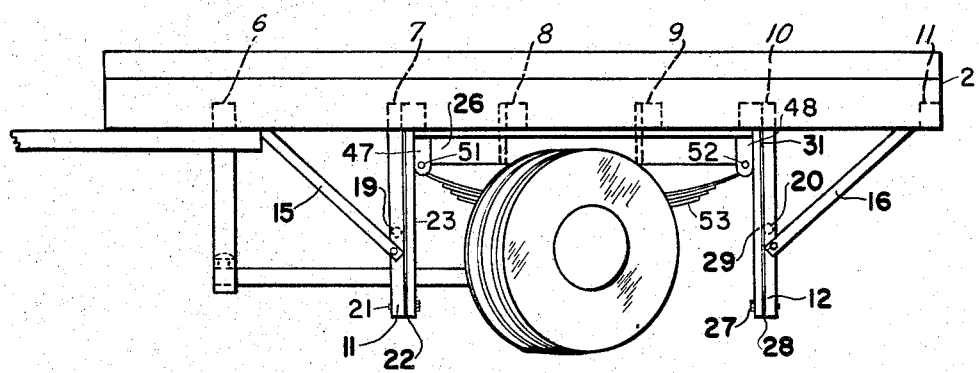
Figure 7:
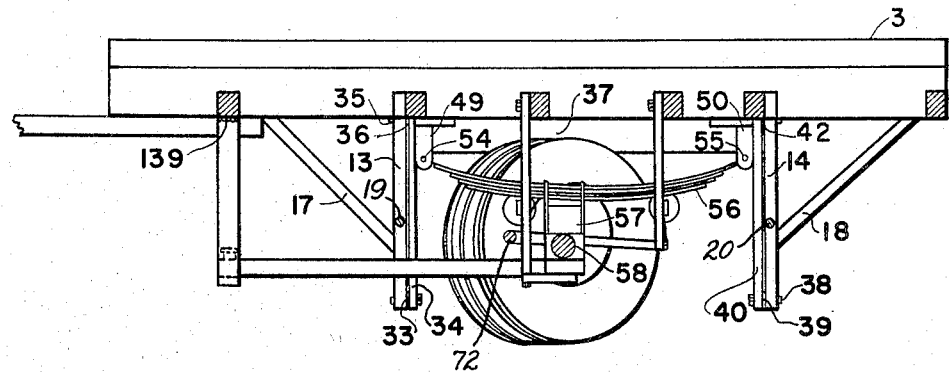
Figure 8:
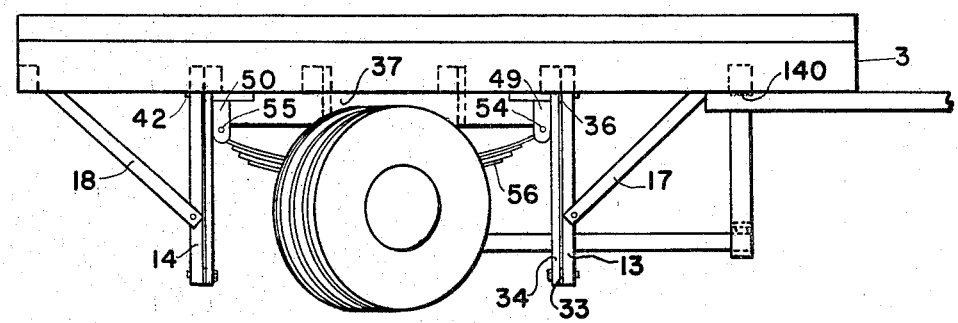
Figure 9:
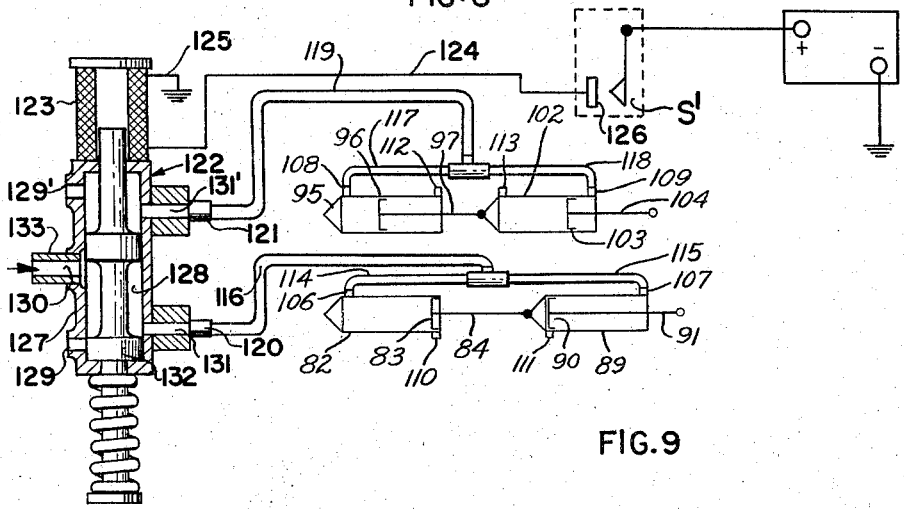

FIGS. 3 and 4 are transverse sectional views taken along lines 3—3 and 4—4, respectively, of FIG. 1;

FIG. 5 is a horizontal sectional view taken along the line 5—5 of FIG. 4;

FIG. 6 is a side elevational view of the trailer as viewed from the left side of FIG. 1;

FIG. 7 is a longitudinal sectional view taken along line 7—7 of FIG. 1;

FIG. 8 is a side elevational view of the trailer taken from the right side of FIG. 1;

FIG. 9 is a schematic view showing the switching control mechanism forming a part of the present invention;

FIGS. 10, 11, 12, and 13 are schematic views illustrating the various positions of the steering control elements forming a part of the present invention;

FIG. 14 is a fragmentary top plan view of a modified form of vehicular trailer constructed in accordance with and embodying the present invention;

FIG. 15 is a side elevational view of the modified form of vehicular trailer;

FIGS. 16, 17, 18, 19, and 20 are transverse sectional views taken along lines 16—16, 17—17, 18—18, 19—19, and 20—20, respectively, of FIG. 14;

FIGS. 21 and 22 are fragmentary sectional views taken along lines 21—21 and 22—22, respectively, of FIG. 15; and FIG. 23 is a schematic view showing the switching control mechanism employed with the modified form of the present invention.

Referring now in more detail and by reference characters to the drawings, which illustrate practical embodiments of the present invention, A designates a vehicular trailer-chassis which may be conventionally supplied with a box, body, or other super-structure of any desired type. Since the box, body, or super-structure are conventional and do not form a part of the present invention, no description or illustration thereof is contained herein.

The trailer-chassis A comprises a rectangular top frame 1 consisting of two spaced parallel channel-iron side rails 2, 3, which are welded at their opposite or corner-ends to transversely extending cross rails 4, 5. Also welded at their ends to, and extending transversely between, the side rails 2, 3, are spaced parallel struts 6, 7, 8, 9, 10, which serve the dual purpose of tying the side rails 2, 3, structurally together and affording subjacent support for the bottom or floor of a box, body, or other super-structure which may be mounted upon the trailer-chassis A. Welded at their upper ends to, and extending vertically downwardly from, the side rails 2, 3, are four substantially vertical legs 11, 12, 13, 14, the legs 11, 12, being located equi-distantly inwardly from the opposite ends of the side rail 2 and the legs 13, 14, being similarly located equi-distantly inwardly from the opposite ends of the side rail 3. Thus, the legs 11, 13, are transversely aligned with each other and the legs 12, 14, are also transversely aligned with each other. The legs 11, 12, 13, 14, are respectively reinforced and additionally supported by two side rails 2, 3, by means of rigidly attached angularly extending brace bars 15, 16, 17, 18. Welded at its opposite ends to, and extending horizontally between, the legs 11, 13, is a transverse stabilizing rod 19 which is located approximately midway between the upper and lower ends of the respective legs 11, 13. Similarly, welded at its opposite ends to, and extending horizontally between, the legs 12, 14, is a transverse stabilizing rod 20.

Pivotally mounted adjacent to the lower end of the leg 11 by means of a longitudinally extending horizontal bearing stud 21 and spacing washer 22 is an upwardly extending rocking link 23, which is substantially shorter in vertical height than the leg 11, and is likewise pivotally mounted at its upper end, by means of a longitudinally extending horizontal bearing stud 24 and spacing washer 25, to the forward end of a longitudinally extending horizontal bolster rail 26. Similarly mounted adjacent to the lower end of the leg 12 by means of a longitudinally extending horizontal bearing stud 27 and spacing washer 28 is an upwardly extending rocking link 29, which is substantially shorter in vertical height than the leg 12, and is likewise pivotally mounted at its upper end, by means of a longitudinally extending horizontal bearing stud 30 and spacing washer 31, to the rear end of the bolster rail 26.

Pivotally mounted adjacent to the lower end of the leg 13 by means of a longitudinally extending horizontal bearing stud 32 and spacing washer 33 is an upwardly extending rocking link 34, which is substantially shorter in vertical height than the leg 13, and is likewise pivotally mounted at its upper end, by means of a longitudinally extending horizontal bearing stud 35 and spacing washer 36, to the forward end of a longitudinally extending horizontal bolster rail 37. Similarly mounted adjacent to the lower end of the leg 14, by means of a longitudinally extending horizontal bearing stud 38 and spacing washer 39, is an upwardly extending rocking link 40, which is substantially shorter in vertical height than the leg 14, and is likewise pivotally mounted at its upper end, by means of a longitudinally extending horizontal bearing stud 41 and spacing washer 42, to the rear end of the bolster rail 37. In this connection, it should be noted that the rocking links 23, 29, 34, 40, are blade-like in shape so as to have some limited degree of flexibility in the forward-and-aft direction.

The bolster rails 26 and 37 are fabricated preferably from inverted U-shaped channel stock and are transversely connected at their ends by cross members 42'. Bolster rails 26, 27, are further respectively provided at their forward and rearward ends with transversely extending shackle bolts 43, 44, 45, 46, which swingably support depending spring shackles 47, 48, 49, 50, respectively. Operatively slung between the shackles 47, 48, and pivotally secured thereto, by means of shackle bolts 51, 52, is a multiple-leaf elliptical spring 53. Similarly slung between the shackles 49, 50, and pivotally secured thereto, by means of shackle bolts 54, 55, is a multiple-leaf elliptical spring 56. Mounted in any suitable manner from, and extending transversely between, the central portions of the springs 53, 56, is a horizontal cross-beam 57 which carries a conventional underslung vehicular axle 58 provided at its opposite ends with drop-forged yokes 59, 60. Conventionally journaled within the yokes 59, 60, for rotation about upright axes of rotation are steering knuckles 61, 62, which are respectively provided with outwardly projecting substantially horizontal spindles 63, 64. Suitably journaled upon the spindles 63, 64, are wheels 65, 66, which are, in turn, conventionally provided with two identical pneumatic tires 67. The bolster rails 26, 37, the springs 53, 56, the wheels 65, 66, and all intermediate associated structure in combination form an under carriage 68.

The steering knuckle 61 is integrally provided with a substantially rigid forwardly projecting steering knuckle arm 69, and, similarly, the steering knuckle 62 is provided with a forwardly projecting steering knuckle arm 70 and a rearwardly projecting auxiliary steering knuckle arm 71. The steering knuckle arms 69, 70, are operatively connected at their forward ends by a transversely extending steering rod 72, which is provided with a rigid upwardly extending vertical thrust arm 73 reinforced by a welded gusset plate 74 and provided at its upper end with a pivot-forming clevis 75. The auxiliary steering knuckle arm 71 is pivotally connected to one end of an auxiliary steering rod 76, which is, in turn, rigidly provided at its other end with an upwardly extending vertical thrust arm 77 reinforced by a welded gusset plate 78 and provided at its upper end with a pivot-forming clevis 79.

Welded at its upper end to, and depending from, the strut 8, a short distance inwardly from the side rail 2, as will be seen by reference to FIG. 3, is a rigid vertical bracket-arm 80 which is reinforced by a welded gusset plate 81. Rockably secured to the lower end of the bracket arm 80 and extending more or less horizontally inwardly therefrom is a pneumatic cylinder 82 having a conventional piston 83 and piston rod 84, the latter being pivotally connected at its inner end by means of a clevis 85 and horizontal pivot pin 86 to the lower end of a control link 87 which is, in turn, pivoted at its upper end to the strut 8 by means of a horizontal bearing stud 88.

Figure 2:
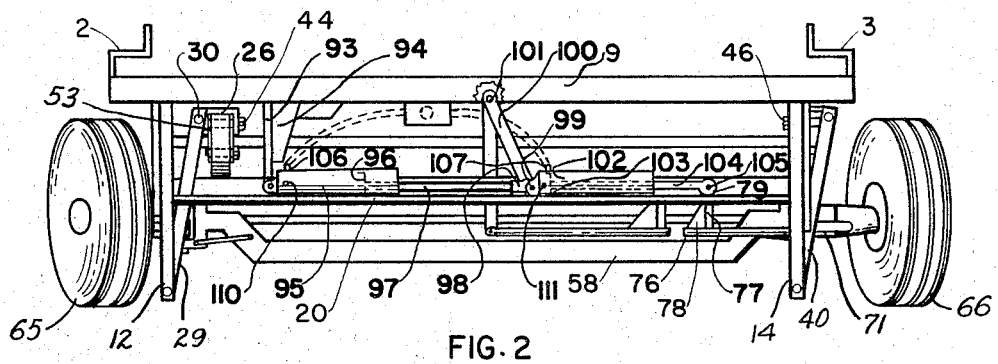
FIG. 2 is a rear end elevational view of the vehicular trailer.

Also pivotally connected to the pivot pin 86 and extending laterally outwardly therefrom more or less in horizontal alignment with the pneumatic cylinder 82 is a second pneumatic cylinder 89 which is substantially identical to the pneumatic cylinder 82 and is provided with a conventional piston 90 and piston rod 91, the latter being pivotally connected at its outer end by means of a pivot pin 92 to the clevis 75 of the thrust arm 73. Similarly welded at its upper end to and depending from the strut 9, as best seen in FIG. 2, is a vertical bracket-arm 93 which is reinforced by a welded gusset plate 94 and is pivotally connected at its lower end to an inwardly extending more or less horizontal pneumatic cylinder 95 which is substantially identical to the cylinder 82, including a piston 96 and a piston rod 97, which is pivotally connected at its inner end by means of a clevis 98 and horizontal pivot pin 99 to the lower end of a control link 100 which is, in turn, pivoted at its upper end to the strut 9 by means of a horizontal bearing stud 101. Similarly pivoted to the pivot pin 99 and extending laterally outwardly therefrom, more or less in horizontal alignment with the pneumatic cylinder 95, is a pneumatic cylinder 102 which is substantially identical to the cylinder 95, including a piston 103 and piston rod 104 which is rockably connected by means of a pivot pin 105 to the clevis 79 of the thrust arm 77.

Referring now to FIGS. 9–13, the cylinders 82, 89, 95, and 102 are of the so-called single acting type and are respectively provided with air-pressure supply fittings 106, 107, 108, 109, and vent orifices 110, 111, 112, 113. The air-pressure supply fittings 106, 107, are connected by flexible air-pressure supply lines 114, 115, respectively, to a common supply conduit 116 and, similarly, the air-pressure supply fittings 108, 109, are connected by air-pressure supply lines 117, 118, to a common supply conduit 119. The conduits 116, 119, are respectively connected to outlet ports 120, 121, of a conventional two-way solenoid-actuated valve 122 having an electrical magnetic coil 123. The terminals are electrically connected, as shown in FIG. 9, by means of flexible insulated electrical conductors 124, 125, to ground and to the contact point or pole 126 of a switch $S^1$ which is preferably the "back-up light switch" conventionally available on most automotive vehicles. Such back-up light switches are entirely conventional and, therefore, are not specifically described or illustrated in detail herein. It is sufficient for present purposes to point out that back-up light switches are connected in operative ways with the transmission of the vehicle so that when the vehicle is shifted into reverse gear, so to speak, the back-up light switch will close and complete a circuit from the battery to the back-up light of the principal vehicle V. The conductor 124 can be connected to the same contact which leads to the back-up light so that the solenoid coil 123 will be energized when the principal vehicle V is shifted into reverse gear for purposes of backing up. The manner of this connection is also entirely conventional and will be understood by those skilled in the art.

The valve 122 comprises a cylindrical body 127 having a chamber 128 with vent ports 129, 129', an inlet port 130, outlet ports 131, 131'. Mounted within the chamber 138 for axial reciprocation is a dual-plug, spring biased valve-spool 132. The inlet port 130 is connected to an air pressure supply line 133. The outlet port 131 is connected to the supply conduit 116 and, similarly, the outlet port 131' is connected to the supply conduit 119.

When the principal vehicle V is in a forward gear and moving forwardly, the switch $S^1$ will be open and the solenoid coil will not be energized. Therefore, the spring biased valve-spool 131 will rest in the position schematically shown in FIG. 9 and, consequently, air pressure will be applied through the common conduit 116 to the cylinder 82, 89, and at the same time the supply conduit 119 will be open to atmosphere through the vent port 129', so that the cylinders 95, 102, will be completely unconstrained.

Figure 10:
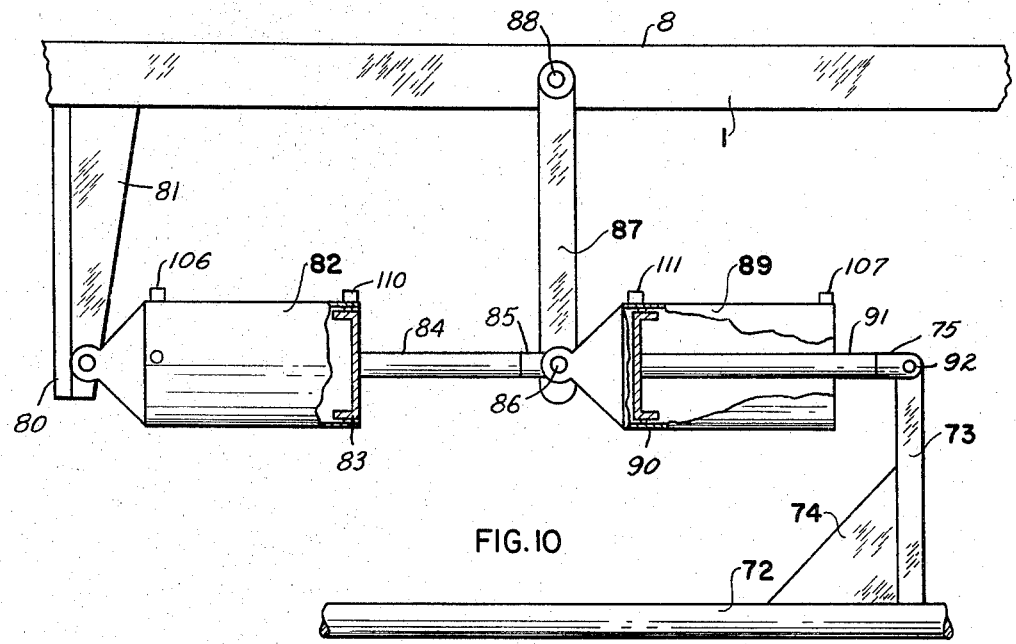
Figure 12:
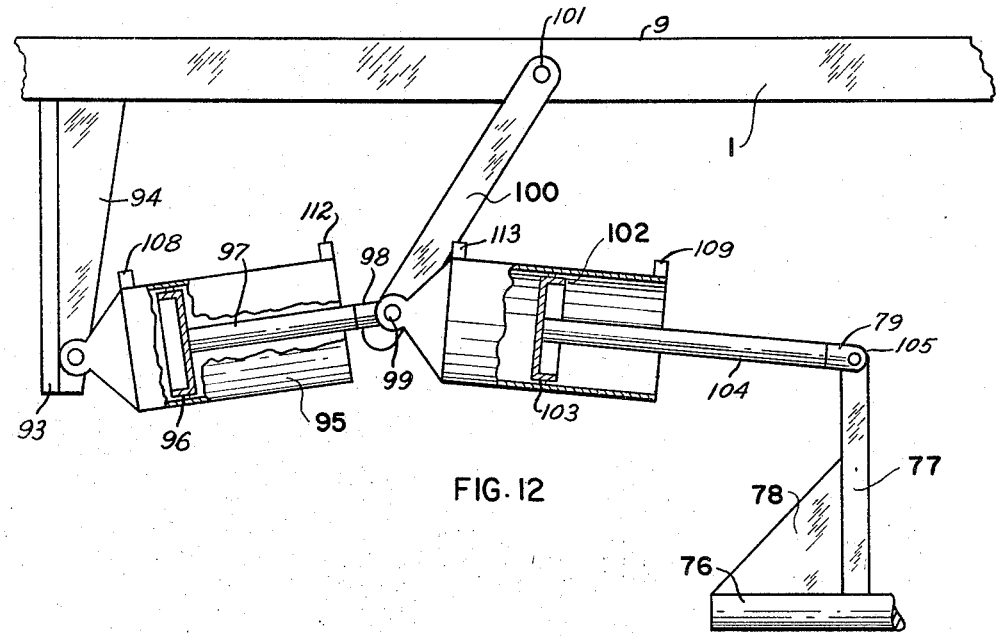

As soon as air pressure is similarly applied to both of the cylinders 82, 89, they will move to centered position so that the control link 87 is locked in centered position and is constrained to move with the top frame 1, as schematically shown in FIG. 10. The control link 100, which is operatively connected between the cylinders 95, 102, is free to swing to-and-fro in either direction and, therefore, will not impose any constraint on the thrust arm 77, as schematically shown in FIG. 12.

Figure 11:
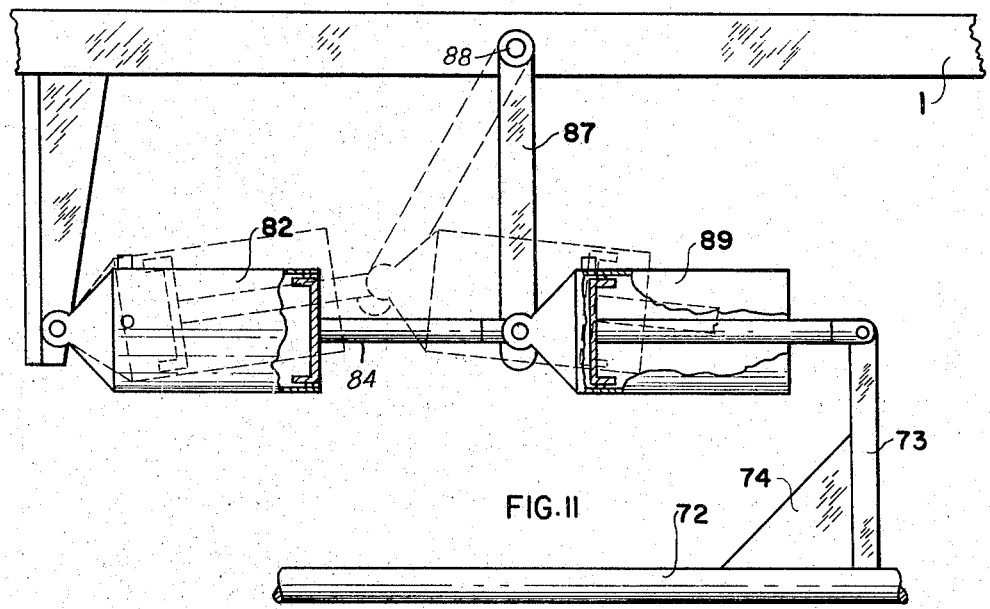
Figure 13:
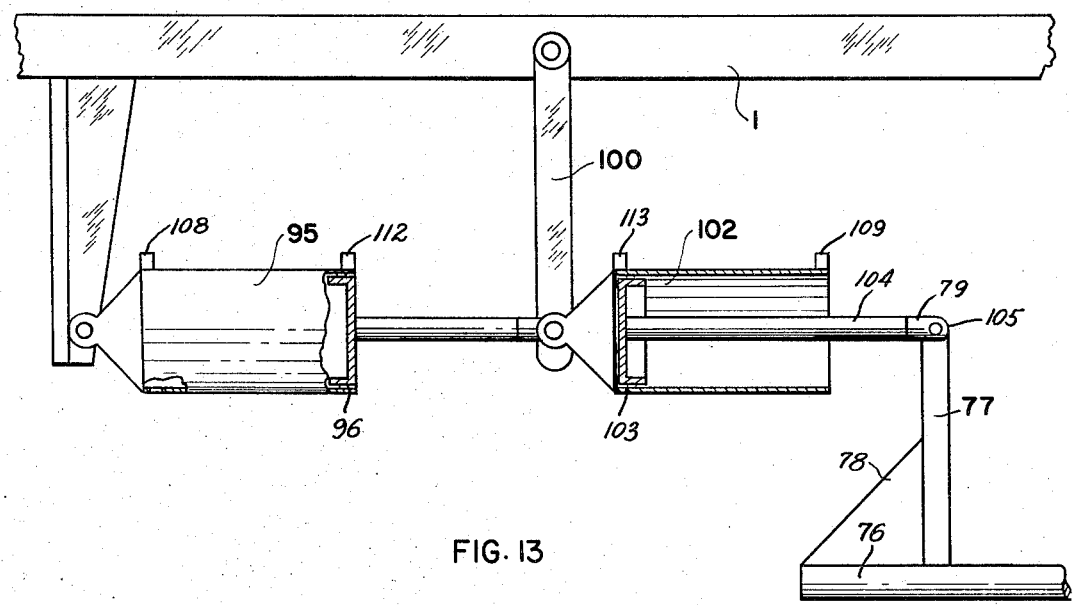

On the other hand, when the switch $S^1$ is in "back-up position," the solenoid coil 123 will be energized and the pneumatic cylinders 95, 102, will be under pressure whereas the pneumatic cylinders 82, 89, will not be under pressure and, accordingly, be free to move in either direction, as illustrated in FIG. 11. Under this latter set of conditions, the forward control link 87 is unconstrained and can swing freely whereas the rear control link 100 is blocked in centered position and is constrained to move to-and-fro with the load carrying frame 1, as schematically shown in FIG. 13.

The trailer-chassis A is connected to the principal vehicle V by two transversely spaced hitch-clamps $C^1$, $C^2$, which may be of any conventional type and are attached to the principal vehicle V in the usual manner. As shown herein, the connection established by the clamps $C^1$, $C^2$, is a non-swivelling connection, but this is primarily a matter of choice and such connection can, if desired, be effected by a single centrally located swivelling trailer-hitch of any conventional type.

Welded or otherwise rigidly secured to the cross-beam 57 and extending forwardly therefrom is a forwardly converging yoke 134 which is centered between the bolster rails 26, 37, and is rigidly provided at its apex with a forwardly projecting draw-bar 135, the latter being swivelly connected, by means of a vertical swivel pin 136, to the bight portion 137 of a U-shaped depending bracket 138 secured centrally on the under side of the cross-rail 4 by welds 139, 140. Consequently, the forward and rearward pulling forces applied to the trailer-chassis A by the principal vehicle V will be transmitted directly and simultaneously both to the load-carrying frame 1 and the under carriage 68. The links 23, 29, 34, 40, have a limited degree of fore-and-aft flexibility which is permissible since they do not have to carry any of the pulling forces and, therefore, as the load-carrying frame 1 and under carriage 68 shift laterally in relation to each other, the yoke 134, drawbar 135, and the entire under carriage 68 can swing slightly about the pivot pin 136 so that the load-carrying frame 1 and under carriage 68 are free to shift laterally whenever necessary without being restricted or impeded by forward or rearward pulling forces.

When the trailer-chassis A, equipped with a suitable body, box, or super-structure, is hitched to the principal vehicle V and pulled in a forward direction, the switch $S^1$, as noted above, is in "off" position so that the solenoid coil 123 is de-energized. The valve elements are thus shifted so as to deliver air under pressure to the lines 116, 114, 115. Correspondingly, the lines 117, 118, and 119, are vented to atmosphere and this, in effect, "releases" the rear thrust arm 77 and control link 100 so that they are free to swing relative to the load-carrying frame 1 and will have no effect on the steering movement of the wheels 65, 66. If the vehicle V and trailer chassis A have been moving in a forward direction, the cylinders 82, 89, will already be centered as shown in FIG. 10 and no shifting movement of the pistons 83, 90, or piston rods 84, 91, will take place. If, however, the wheels 65, 66, happen to be swung to the left, as shown in FIG. 1, the control link 87 is accordingly swung to the left. In such case, the air pressure shifts the pistons 83 and 90 inwardly toward the vertical centerline of the load-carrying frame 1, and accordingly, will shift the control link 87 to vertical or so-called "centered" position, as shown in FIG. 10. In this position, the control link 87 is rigidly locked to load-carrying frame 1 and the wheels 65, 66, are in straightforward position. If, on the other hand, the wheels 65, 66, happen to be shifted in the opposite direction, the control link 87 will correspondingly be swung in the opposite direction to centered position.

The relationships and sizes of the various components are such that when the principal vehicle V and trailer-chassis A are moving in a straightforward direction, the wheels are in a straight fore-and-aft position and the links 23, 29, 34, and 40, are in substantially vertical alignment with the legs 11, 12, 13, 14.

If the principal vehicle V commences to make a right turn, i.e. a turn in the direction of the arrow in FIG. 1, the connection between the vehicle V and the load-carrying frame 1 causes the latter to shift to the left with respect to the bolster rails 26, 37. Since the wheels 65, 66, of the under carriage 68 are on the ground, so to speak, the under carriage 68 tends to maintain straight line forward travel by reason of inertia. Since the control link 87 is, in effect, bound to the load-carrying frame 1, it will pull the steering rod 72 and steering knuckle arm 69 to the left, as schematically shown in FIG. 10, swinging the wheels 65, 66, into approximately the position shown in FIG. 1, so that they will track properly behind the rear wheels of the principal vehicle V as it makes a right turn. The amount of angular displacement of the links 23, 29, 34, and 40, and the corresponding degree to which the wheels 65, 66, are angularly swung is directly proportional to the sharpness of the turn being made, so that the steering action of the wheels 65, 66, is automatic.

If, on the other hand, the vehicle V turns to the left, the load-carrying frame 1 shifts to the right and the links 23, 29, 34, 40, rock angularly in the opposite direction. In other words, the load-carrying frame 1 moves to the right with respect to the bolster rails 26, 37, and the control link 87, which still retains its vertical or centered position, pushes the steering rod 72 and steering knuckle arm 69 to the right, thereby swinging the wheels 65, 66, into the opposite angularly swung position. As a result, the wheels 65, 66, will track properly behind the rear wheels of the principal vehicle V as it makes the left turn. Meanwhile, since the rear thrust arm 77 and the control link 100 associated therewith are free to shift in either direction, they will do so as the forward steering rod 72 shifts and will, as previously pointed out, have no effect on the wheels 65, 66, as schematically shown in FIG. 12.

When it is necessary or desirable to back up, the switch $S^1$ is closed and the solenoid coil 123 of the valve 122 is energized. This, in effect, applies air under pressure to the rear cylinders 95, 102, causing them to "center" the control link 100 and lock it to the load-carrying frame 1, as schematically shown in FIG. 13. At the same time, the lines 114, 115, 116, are, in effect, vented to atmosphere and the forward cylinders 82, 89, become free to shift in either direction. The control link 87 is accordingly released for free-swinging action, with the result that the forward thrust arm 73 is free. Consequently, the reverse sequence of steering movements will take place responsive to turning movement of the principal vehicle V and the wheels 65, 66, will again track properly.

It should be particularly noted in this connection that the pairs of cylinders 82–89 and 95–102 are merely alternatively acting locking means which hold the respective thrust arms 73, 77, rigidly in connected position with respect to the load-carrying frame 1, depending upon the position of the switch $S^1$, and are not to be confused with power steering mechanisms. Moreover, it should be obvious that a hydraulic system can be substituted for the pneumatic system herein described.

The present invention can also be applied to large overthe-road trailers by means of the modified form of trailer-chassis D which comprises a rectangular top frame 141 formed preferably of square-section steel tubing and consisting of two spaced parallel rails 142, 143, which are welded at their opposite ends to transversely extending cross rails 144, 145. Also welded at their ends to, and extending transversely between, the side rails 142, 143, are spaced parallel struts 146, 147, 148, 149, 150, which are similarly formed of square-section steel tubing and serve the dual purpose of tying the side rails 142, 143, structurally together and affording subjacent support for the bottom or floor of a box, body, or other superstructure which may be mounted upon the trailer-chassis D. In this connection, it will be noted that the forward ends of the side rails 142, 143, are fragmentarily broken away for simplicity of illustration, but it would be obvious that these side rails 142, 143, extend forwardly and are provided with some conventional hitch or connection adapted for operative engagement with a fifth wheel or similar device on a principal vehicle or tractor. Since fifth wheels and similar structures are well known in the art and do not per se form any part of the present invention, no illustration or description thereof is contained herein.

Welded at their upper ends to, and extending vertically downwardly from, the forward portion of the side rails 142, 143, reference being made to FIGS. 14, 19, 20 and 22, are four substantially vertical legs 151, 152, 153, 154, the legs 151, 153, being transversely aligned with each other and the legs 152, 154, being also transversely aligned with each other. The legs 151, 152, 153, 154, are respectively and additionally supported from the side rails 142, 143, by means of rigidly attached angularly extending brace bars 155, 156, 157, 158. Welded at its opposite ends to, and extending horizontally between, the legs 151, 153 is a transverse stabilizing rod 159, which is located approximately midway between the upper and lower ends of the respective legs 151, 153. Similarly, welded at its opposite ends to, and extending horizontally between, the legs 152, 154 is a transverse stabilizing rod 160.

Operatively disposed between the four legs 151, 152, 153, 154 is a forward wheel-and-axle assembly, or so-called undercarriage 161 comprising spaced parallel cross-beams 162, 163 transversely connected by end-rails 164, 165, which are respectively welded at their ends thereto. Midway between the cross-beams 162, 163, the end-rails 164, 165 are provided with depending support pads 166, 167, which are securely attached to bulbous resilient air springs 168, 169, respectively, and on their under faces the air springs 168, 169, are respectively attached to support pads 170, 171.

Mounted in any suitable manner from, and extending horizontally between, the support pads 170, 171 is an undersiung vehicular axle 172 provided at its opposite ends with drop forged yokes 173, 174. Conventionally journaled within the yokes 173, 174 for swiveling about upright axes of rotation are steering knuckles 175, 176, which are respectively provided with outwardly projecting substantially horizontal spindles 177, 178. Suitably journaled upon the spindles 177, 178, are wheels 179, 180, which are, in turn, conventionally provided with two identical pneumatic tires 181, 182. The steering knuckle 175 is integrally provided with a substantially rigid forwardly projecting steering knuckle arm 183 and a rigid rearwardly projecting steering knuckle arm 184. Similarly, the steering knuckle 176 is provided with a forwardly projecting steering knuckle arm 185 and a rearwardly projecting steering knuckle arm 186. The steering knuckle arms 183, 185 are operatively connected at their forward ends by a transversely extending steering rod 187, which is rigidly provided with an upwardly projecting vertical thrust arm 188 reinforced by a welded gusset plate 189. Similarly the steering knuckle arms 184, 186, are operatively connected at their rearward ends by a transversely extending steering rod 190, which is rigidly provided with an upwardly projecting vertical thrust arm 191 reinforced by a welded gusset plate 192.

Pivotally mounted adjacent to the lower end of the leg 151 by means of a horizontal bearing stud 193 and spacing sleeve 194 is an upwardly extending suspension chain 195, which is somewhat shorter in vertical height than the leg 151, and is likewise pivotally mounted at its upper end, by means of a bearing stud 196 and spacing sleeve 197, on the lateral end of the forward cross-beam 162. Similarly mounted adjacent to the lower end of the leg 153 by means of a horizontal bearing stud 198 and spacing sleeve 199 is an upwardly extending suspension chain 200, which is somewhat shorter in vertical height than the leg 153 and is likewise pivotally mounted at its upper end, by means of a bearing stud 201 and spacing sleeve 202 to the other lateral end of the cross-beam 162.

Pivotally mounted adjacent to the lower end of the leg 152 by means of a horizontal bearing stud 203 and spacing sleeve 204 is an upwardly extending suspension chain 205, which is somewhat shorter in vertical height than the leg 152, and is likewise pivotally mounted at its upper end, by means of a bearing stud 206 and spacing sleeve 207, to the lateral end of the rear cross-beam 163. Similarly mounted adjacent to the lower end of the leg 154 by means of a horizontal bearing stud 208 and spacing sleeve 209 is an upwardly extending suspension chain 210, which is substantially shorter in vertical height than the leg 154, and is likewise pivotally mounted at its upper end, by means of a bearing stud 211 and spacing sleeve 212 to the other lateral end of the cross-beam 163.

Figure 16:
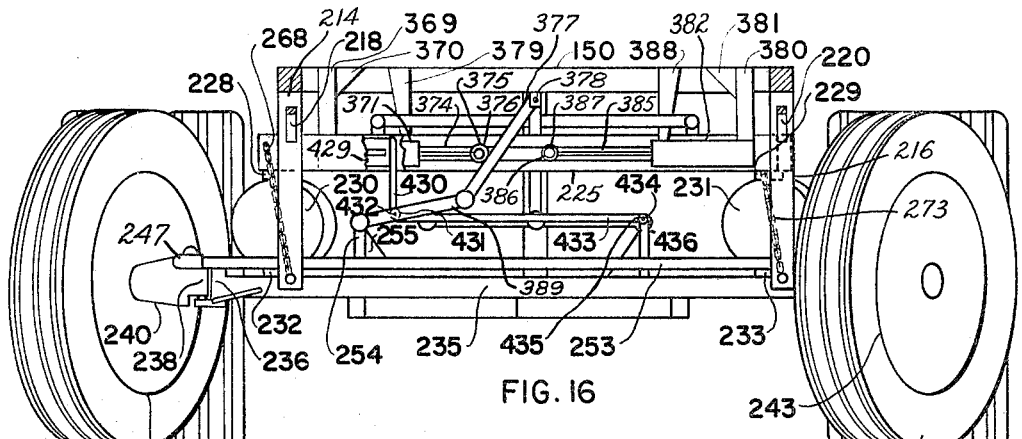
Figure 17:
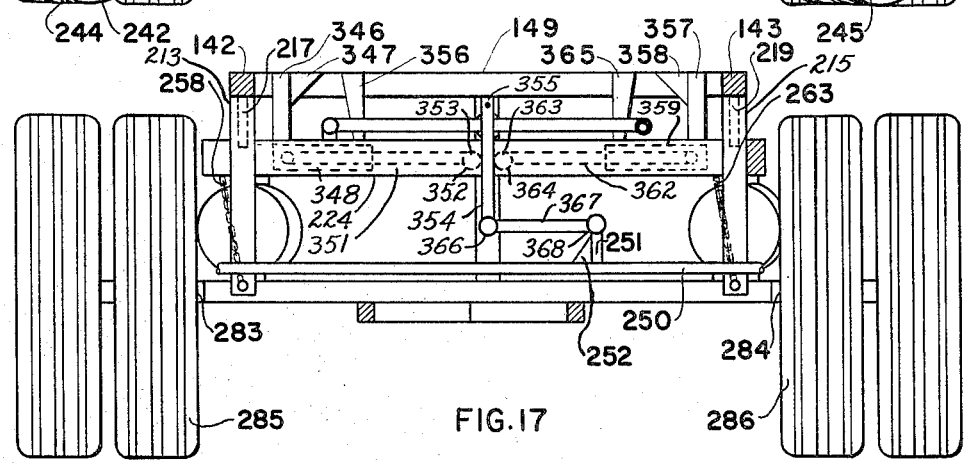

Welded at their upper ends to, and extending vertically downwardly from, the rear portion of the side rails 142, 143, as will be seen by reference to FIGS. 14, 16, and 17, are four substantially vertical legs 213, 214, 215, 216, the legs 213, 215 being transversely aligned with each other and the legs 214, 216, being also transversely aligned with each other. The legs 213, 214, 215, 216, are respectively reinforced and additionally supported from the side rails 142, 143 by means of rigidly attached angularly extending brace bars 217, 218, 219, 220. Welded at its opposite ends to, and extending horizontally between, the legs 213, 215, is a transverse stabilizing rod 221 which is located approximately midway between the upper and lower ends of the respective legs 213, 215. Similarly, welded at its opposite ends to, and extending horizontally between, the legs 214, 216, is a transverse stabilizing rod 222.

Operatively disposed between the four legs 213, 214, 215, 216, is a rear wheel-and-axle assembly or so-called undercarriage 223 comprising cross-beams 224, 225, transversely connected by end-rails 226, 227, which are respectively welded at their ends thereto. Midway between the cross-beams 224, 225 the end-rails 226, 227 are provided with downwardly projecting support pads 228, 229, which are securely attached to bulbous resilient air springs 230, 231, respectively, and on their under faces the air springs 230, 231, are respectively attached to support pads 232, 233.

Mounted in any suitable manner, from, and extending horizontally between, the support pads 232, 233, is an air underslung vehicular axle 235 provided at its opposite ends with drop-forged yokes 236, 237. Conventionally journaled within the yokes 236, 237, for swiveling about upright axes of rotation are steering knuckles 238, 239, which are respectively provided with outwardly projecting substantially horizontal spindles 240, 241. Suitably journaled upon the spindles 240, 241, are wheels 242, 243, which are, in turn, conventionally provided with two identical pneumatic tires 244, 245. The steering knuckle 238 is integrally provided with a substantially rigid forwardly projecting steering knuckle arm 246 and a rigid rearwardly projecting steering knuckle arm 247. Similarly, the steering knuckle 239 is provided with a forwardly projecting steering knuckle arm 248 and a rearwardly projecting steering knuckle arm 249. The steering knuckle arms 246, 248, are operatively connected at their forward ends by a transversely extending steering rod 250, which is rigidly provided with an upwardly projecting vertical thrust arm 251 reinforced by a welded gusset plate 252. Similarly, the steering knuckle arms 247 and 249 are operatively connected at their rearward ends by a transversely extending steering rod 253, which is rigidly provided with an upwardly projecting vertical thrust arm 254 reinforced by a welded gusset plate 255.

Pivotally mounted adjacent to the lower end of the leg 213 by means of a horizontal bearing stud 256 and spacing sleeve 257 is an upwardly extending suspension chain 258, which is substantially shorter in vertical height than the leg 213, and is likewise pivotally mounted at its upper end, by means of a bearing stud 259 and spacing sleeve 260, on one lateral end of the forward cross-beam 224. Similarly mounted adjacent to the lower end of the leg 215 by means of a horizontal bearing stud 261 and spacing sleeve 262 is an upwardly extending chain 263, which is substantially shorter in vertical height than the leg 215, and is likewise pivotally mounted at its upper end, by means of a bearing stud 264 and spacing sleeve 265, to the other lateral end of the cross-beam 224.

Pivotally mounted adjacent to the lower end of the leg 214 by means of a horizontal bearing stud 266 and spacing sleeve 267 is an upwardly extending suspension chain 268 which is substantially shorter in vertical height than the leg 214, and likewise pivotally mounted at its upper end, by means of a bearing stud 269 and spacing sleeves 270 to one lateral end of the rear cross-beam 225. Similarly mounted adjacent to the lower end of the leg 216 by means of a horizontal bearing stud 271 and spacing sleeve 272 is an upwardly extending suspension chain 273, which is substantially shorter in vertical height than the leg 216, and is likewise pivotally mounted at its upper end, by means of a bearing stud 274 and spacing sleeve 275 to the other lateral end of the crossbeam 225.

Welded to the axle 172 and extending forwardly therefrom is a forwardly converging horizontal draft-yoke 276 which is provided at its apex with a forwardly projecting draw-bar 277 pivotally connecting by a depending vertical pintle 278 to the cross-rail 144. Similarly welded to the axle 235 and extending forwardly therefrom is a forwardly converging draft-yoke 279 which is provided at its apex with a draw-bar 280 pivotally connected by a depending vertical pintle 281 to be strut 148.

Figure 18:
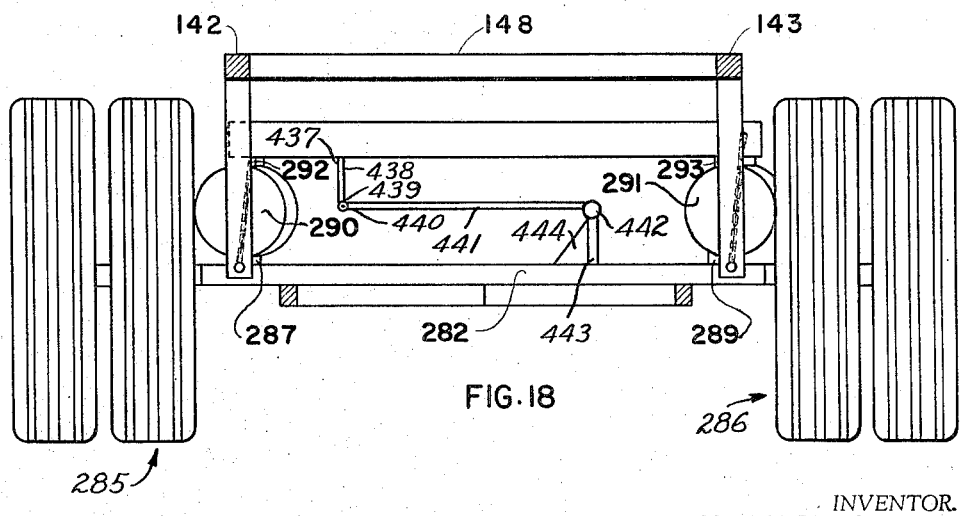

Suitably mounted midway between the under carriages 161, 223, as best seen in FIGS. 14 and 18, is a non-steerable axle 282 provided at its outer ends with non-swiveling axle-spindles 283, 284, which operatively support dual wheel and tire units 285, 286. Rigidly secured to the axles 282 by means of metal plates or so-called mounting pads 287, 289 are two bulbous air springs 290, 291, respectively, which are in turn, secured by means of similar mounting pads 292, 293, to a cross-beam 294 which is, in turn, rigidly fastened to the rails 142, 143. Welded to the axle 282 and extending forwardly therefrom is a forwardly converging draft-yoke 295 provided at its apex with a draft-bar 296 pivotally secured, by means of a depending vertical pintle 297 to the strut 147.

The air springs 168, 230, and 290 are pneumatically connected at their upper ends by a flexible air-tube 298 which runs down the interior of the rail 142 and, similarly, the air springs 169, 231 and 291 are pneumatically connected at their upper ends by a flexible air-tube 269 which runs down the interior of the rail 143.

Welded at its upper end to, and depending from, the strut 146, inwardly from the side-rail 142, referring again to FIGS 20 and 22 is a rigid vertical bracket-arm 300 which is reinforced by a gusset plate 301. Rigidly secured to the lower end of the bracket-arm 300 and extending horizontally inwardly therefrom is a pneumatic cylinder 302 having a piston 303 biased inwardly toward the center line of the top-frame 141 by an internal spring 304. Connected at its interior end to the piston 303 and extending axially from the cylinder 302 is a piston rod 305 provided at its outer end with clevis-like fitting 306 having a laterally presented roller 307 which is adapted to bear slidably against the side face of a control link 308 rockably secured at its upper end by means of a horizontal pintle 309 to the center of the strut 146. Preferably the inboard end of the cylinder 302 is reinforced and supported by a gusset plate 310.

Similarly welded at its upper end to, and depending from the strut 146, inwardly from the side-rail 143, is a rigid vertical bracket-arm 311 which is reinforced by a gusset plate 312. Rigidly secured to the lower end of the bracket-arm 311 and extending horizontally inwardly therefrom is a pneumatic cylinder 313 having a piston 314 biased inwardly toward the center line of the top-frame 141 by an internal spring 315. Connected at its interior ends to the piston 314 and extending axially from the cylinder 313 is a piston rod 316 provided at its outer end with clevis-like fitting 317 having a laterally presented roller 318, which is adapted to bear slidably against the opposite side face of the control link 309. Preferably the inboard end of the cylinder 313 is reinforced and supported by a gusset plate 319. The control link 308 extends downwardly below the cylinders 302, 313 and at its lower end is connected by a ball-and-socket joint 320 to a control rod 321 which is, in turn, connected at its other end, by a ball-and-socket joint 322 to the upper end of the forward thrust arm 188 of the under carriage 161.

Welded at its upper end to, and depending from, the strut 147, adjacent to the side-rail 142, as will be seen by reference to FIG. 19, is a rigid vertical bracket-arm 323 which is reinforced by a gusset plate 324. Rigidly secured to the lower end of the bracket-arm 323 and extending horizontally inwardly therefrom is a pneumatic cylinder 325 having a piston 326 biased inwardly toward the center line of the top-frame 141 by an internal spring 327. Connected at its interior end to the piston 326 and extending axially from the cylinder 325 is a piston rod 328 provided at its outer end with clevis-like fitting 329 having a laterally presented roller 330 which is adapted to bear slidably against the side face of a control link 331 rockably secured at its upper end by the means of a horizontal pintle 332 to the center of the strut 147. Preferably the inboard end of the cylinder 325 is reinforced and supported by a gusset plate 333.

Similarly welded at its upper end to, and depending from, the strut 147, adjacent to the side-rail 143, is a rigid vertical bracket-arm 334 which is reinforced by a gusset plate 335. Rigidly secured to the lower end of the bracket-arm 334 and extending horizontally inwardly therefrom is a pneumatic cylinder 336 having a piston 337 biased inwardly toward the center line of the top-frame 141 by an internal spring 338. Connected at its interior end to the piston 337 and extending axially from the cylinder 336 is a piston rod 339 provided at its outer end with clevis-like fiitting 340 having a laterally presented roller 341 which is adapted to bear slidably against the other side face of the control link 331. Preferably the inboard end of the cylinder 336 is reinforced and supported by a gusset plate 342. The conntrol link 331 extends downwardly below the cylinders 325, 336, and at its lower end is connected by a ball-and-socket joint 343 to a control rod 344 which is, in turn, connected at its other end, by a ball-and-socket joint 345 to the upper end of the rear thrust arm 191 of the under carriage 161.

Welded at its upper end to, and depending from, the strut 149, adjacent the side-rail 142, reference being made to FIG. 17, is a rigid vertical bracket-arm 346 which is reinforced by a gusset plate 347. Rigidly secured to the lower end of tthe bracket-arm 346 and extending horizontally inwardly therefrom is a pneumatic cylinder 348 having a piston 349 biased inwardly toward the center line of the top-frame 141 by an internal spring 350. Connected at its interior end to the piston 349 and extending axially from the cylinder 348 is a piston rod 351 provided at its outer end with clevis-like fitting 352 having a laterally presented roller 353 which is adapted to bear slidably against the side face of a control link 354 rockably secured at its upper end by means of a horizontal pintle 355 to the center of the strut 149. Preferably the inboard end of tthe cylinder 348 is reinforced and supported by a gusset plate 356.

Similarly welded at its upper end to, and depending from, the strut 149, adjacent the side-rail 143, is a rigid vertical bracket-arm 357, which is reinforced by a gusset plate 358. Rigidly secured to the lower end of the bracket-arm 357 and extending horizontally inwardly therefrom is a pneumatic cylinder 359 having a piston 360 biased inwardly toward the center line of the top-frame 141 by an internal spring 361. Connected at its interior end to the piston 360 and extending axially from the cylinder 359 is a piston rod 362 provided at its outer end with clevis-like fitting 363 having a laterally presented roller 364 which is adapted to bear slidably against the other side face of a control link 364. Preferably the inboard end of the cylinder 359 is reinforced and supported by a gusset plate 365. The control link 354 extends downwardly below the cylinders 348, 359 and at its lower end is connected by a ball-and-socket joint 366 to a control rod 367 which is, in turn, connected at its other end, by a ball-and-socket joint 368 to the upper end of the forward thrust arm 251 of the rear under carriage 223.

Welded at its upper end to, and depending from, the strut 150, adjacent to the side rail 142, is a rigid vertical bracket-arm 369 which is reinforced by a gusset plate 370 as best seen in FIG. 16. Rigidly secured to the lower end of the bracket-arm 369 and extending horizontally inwardly therefrom is a pneumatic cylinder 371 having a piston 372 biased inwardly toward the center line of the top-frame 141 by an internal spring 373. Connected at its interior end to the piston 372 and extending axially from the cylinder 371 is a piston rod 374 provided at its outer end with clevis-like fitting 375 having a laterally presented roller 376 which is adapted to bear slidably against the side face of a control link 377 rockably secured at its upper end by means of a horizontal pintle 378 to the center of the strut 150. Preferably the inboard end of the cylinder 371 is reinforced and supported by a gusset plate 379.

Similarly welded at its upper end to, and depending from, the strut 150, adjacent the side-rail 143, is a rigid vertical bracket-arm 380 which is reinforced by a gusset plate 381. Rigidly secured to the lower end of the bracket-arm 380 and extending horizontally inwardly therefrom is a pneumatic cylinder 382 having a piston 383 biased inwardly toward tthe center line of the top-frame 141 by an internal spring 384. Connected at its interior end to the piston 383 and extending axially from the cylinder 382 is a piston rod 385 provided at its outer end with clevis-like 386 having a laterally presented roller 387, which is adapted to bear slidably against the other side face of a control link 377. Preferably the inboard end of the cylinder 382 is reinforced and supported by a gusset plate 388. The control link 377 extends downwardly below the cylinder 371, 382 and at its lower end, is connected by a ball-and-socket joint to a control rod 389 which, in turn, is pivotally connected to the upper end of the rear thrust arm 254 of the rear under-carriage 223.

The cylinders 302, 313, 325, 336, 348, 359, 371, and 382 are of the so-called single actuating type and are respectively provided with air pressure supply fittings 390, 391, 392, 393, 394, 395, 396, and 397, respectively, and vent orifices at their opposite ends. The air pressure supply fittings 390, 391, 394, 395, are connected by flexible air pressure supply lines 406, 407, respectively, to a common air pressure supply conduit 408 and, similarly, the air pressure supply fittings 392, 393, 396, 397, are connected by air pressure supply lines 409, 410, respectively, to a common air pressure supply conduit 411. The common air pressure supply conduits 408, 411, are respectively connected to outlet ports 412, 413, of a conventional two-way solenoid actuated valve 414 which is identical in all respects to the previously described solenoid-actuated valve 122 and includes an electromagnetic coil 415 connected by flexible electrical conductors 416, 417, to a back-up switch S², the circuitry being the same as that shown in FIG. 9. The solenoid-actuated valve 414 is also connected through an inlet port 418 to an air pressure supply line 419 and then to a conventional source of pressure usually available in automotive vehicles which are intended for drawing trailers of any type. The solenoid-actuated valve 414 is also provided with vent ports 420, 420', which serve the same function as the vent ports 129, 129', of the previously described solenoid-actuated valve 122.

When the switch S² is in so-called "off" position and the transmission of the principal vehicle is in a forward-going configuration, the coil 415 will not be energized and positive pressure will accordingly be delivered with the air pressure supply line 408 so as to apply positive pressure to the pneumatic cylinders 302, 313, 371, 382. At the same time, pressure will be relieved from the conduit 411 and the cylinders 325, 336, 348, 359, will be free to move in either direction. Contrariwise, when the switch S² is in back-up position, the coil 415 will be energized and the pneumatic cylinders 325, 336, 348, 359, will be under pressure whereas the pneumatic cylinders 302, 313, 371, 382, will not be under pressure and will accordingly be free to move in either direction.

When the switch S² is in the "off" or forward-going position and the pneumatic cylinders 302, 313, are under pressure, the pistons 303, 316, and the piston rods 305, 318, will be shifted inwardly toward the longitudinal centerline of the top-frame 141 to the inward limits of their respective movement and the rollers 307, 320, which bear against the side faces of the control link 308 will bring the control link 308 to vertically centered position and hold it fixedly in this position. In other words, when the cylinders 302, 313, are under pressure, the control link 308 will be "locked," so to speak, in centered position to the top-frame 141 and will be constrained to shift laterally with the top-frame 141. Meanwhile, since the cylinders 325, 336, are not under pressure the pistons 326, 337, will be merely biased inwardly by the means of the springs 327, 338, respectively, and the rollers 330, 341, will merely bear against the side faces of the control link 331 but will not constrain it from free swinging action. Consequently, if the control link 331 is required to do so, it is free to swing to either side past its vertically centered position and, accordingly, will become momentarily disengaged from one or the other of the rollers 330, 341, while at the same time compressing one or the other of the springs 327, 338. It will thus be evident that by this means the wheels 179, 180, of the under-carriage 161 will be steerably controlled by the lateral shifting movement of the top-frame 141 through the locked forward control link 308. Since the pneumatic cylinders 371, 382, are also under pressure when the pneumatic cylinders 302, 313, are under pressure, by a similar sequence of functions, the forward control link 354 of the rear under-carriage 323 will be "locked" in vertically centered position to the top-frame 141.

When the principal vehicle makes a forward-going left turn, as indicated by the arrow in FIG. 14, the hitch by which the trailer D is connected to the principal vehicle will shift to the left, shifting the forward end of the top-frame 141 to the left with it. At the same time, the entire trailer D will tend to pivot around the wheel and tire units 285, 286, and consequently, the rear end of the top-frame 141 will shift laterally to the right. These shifting movements of the top-frame 141 will correspondingly swing the front wheels 179, 180, and the rear wheels 242, 243, to the angulated positions shown in FIG. 14.

Rigidly welded to the end-rail 165 is an L-shaped bracket 421 having a depending leg 422 provided at its lower end with a clevis 423. Pivotally connected at one end, by means of a pin 424, to the clevis 423 is a transversely extending stabilizer rod 425 which is, in turn, pivotally connected at its other end by means of a pin 426 to a clevis 427 rigidly secured upon the upper end of a vertical bracket-arm 428 welded at its lower end to the axle 172. The stabilizer rod 425 extends more or less over and along the axle 172 and can rock up and down as the air springs 168, 169, contract and expand. However, the stabilizer rod 425 prevents relative lateral shifting movement betwen axle 172 and the upper framework formed by the cross-beams 162, 163, and the end-rails 164, 165.

Similarly, welded to the end-rail 226 is an L-shaped bracket 429 having a depending leg 430 provided at its lower end with a clevis 431. Pivotally connected at one end, by means of a pin 432, to the clevis 431 is a transversely extending stabilizer rod 433 which is, in turn, pivotally connected at its other end, by means of a pin 434, to a clevis 435 rigidly secured upon the upper end of a veritcal bracket-arm 436 welded at its lower end to the axle 235. The stabilizer rod 433 extends more or less over and along the axle 235 and can rock up and down as the air springs 230, 231, contract and expand. However, the stabilizer rod 433 prevents relatively lateral shifting movement between axle 235 and the upper framework formed by the cross-beams 224, 225, and the end-rails 226, 227.

Rigidly welded to the side-rail 142 directly above the air spring 290 is an L-shaped bracket 437 having a depending leg 438 provided at its lower end with a clevis 439. Pivotally connected at one end, by means of a pin 440, to the clevis 439 is a transversely extending stabilizer rod 441 which is, in turn, pivotally connected at its other end, by means of a pin 442, to a clevis 443 rigidly secured upon the upper end of a vertical bracket-arm 444 welded at its lower end to the axle 282. The stabilizer rod 441 extends more or less over and along the axle 282 and can rock up and down as the air springs 290, 291, contract and expand. However, the stabilizer rod 441 prevents relative lateral shifting movement between axle 282 and the cross-beam 294.

When the trailer-chassis D, equipped with a suitable body, box, or super-structure, is hitched to a principal vehicle and pulled in a forward direction, the switch S² is shifted to "off" position so that the coil 4 is de-energized. As previously stated, the valve elements are thus shifted so as to deliver air under pressure to the lines 406, 407, 408, and the forward control links 308, 354, are locked and transmit steering movements from the top-frame 141 and principal vehicle as previously described. On the other hand, the lines 409, 410, 411, are vented to atmosphere and this, in effect, "releases" the rear control links 331, 377, so that they are free to swing relative to the load-carrying frame 141 and will have no effect on the steering movement of any of the wheels 179, 180, 242, 243. If the principal vehicle and trailer-chassis D have been moving in a forward direction, the cylinders 302, 313, 348, 359, will already be centered and no shifting movement of the pistons 303, 314, 349, 360, or piston rods 305, 316, 351, 362, will take place. If, however, the wheels 179, 180, happen to be swung to the left and the wheels 242, 243, are correspondingly swung to the right, as would be the case if the trailer D was stopped during a forward-going left turn. The free control links 331, 377, will accordingly be swung to the right and left respectively. If then the principal vehicle is shifted into reverse so that the back-up switch S² is closed or shifted to "on" position, the forward control links 308, 354, are unlocked and the air pressure predisposes the pistons 337 and 383 to shift inwardly toward the vertical centerline of the load-carrying frame 141. As soon as the principal vehicle and trailer-chassis D begin to back up and the control links 331, 377, of course, move with it and as soon as they are "centered," they become rigidly locked to the load-carrying frame 141 and the wheels 179, 180, 242, 243, are in straightforward position. If, on the other hand, the wheels 179, 180, 242, 243, happen to be shifted respectively in the opposite directions as a result of stopping on a forward-going right turn, the piston rods 339, 374, will be centered, the control link 331 will be swung to the left, and the control link 379 will be swung to the right. In such case, when air is admitted to cylinders 325, 359, the pistons 326, 360, and piston rods 328, 362, will be predisposed to shift toward the centerline of the top-frame 141, as soon as the trailer-chassis D begins to back up.

If the principal vehicle and trailer D have been moving forward in a straight direction and then the principal vehicle commences to make a left turn, i.e. a turn in the direction of the arrow in FIG. 14, the connection between the vehicle and the load-carrying frame 141 causes the forward end of the latter to shift to the left and the rear end to the right. Since the wheels 179, 180, 242, 243, are on the ground, so to speak, the undercarriages 161, 223, tend to maintain straight line forward travel by reason of inertia. Since the control links 308, 358, cannot move out of "centered" position and are, in effect, bound to the load-carrying frame 141. Thus, the control link 308 will pull the steering rod 187 to the left, correspondingly turning the wheels 179, 180, and the control link 354 will pull the steering rod 250 to the right correspondingly turning the wheels 242, 243. Consequently, the trailer D will track properly behind the rear wheels of the left-turning principal vehicle. The amount of lateral displacement of the control links 308, 354, and the correspondingly degree to which the wheels 179, 180, 242, 243, are turned is directly proportional to the sharpness of the turn being made, so that the steering action is automatic.

If, on the other hand, the principal vehicle turns to the right, the load-carrying frame 141 shifts to the right and the control links 308, 354, rock angularly in the opposite directions, respectively. In other words, the load-carrying frame 141 moves to the right with respect to the undercarriages 161, 223, and the control link 308, which still retains its vertical or centered position, pushes the steering rod 187 to the right, thereby correspondingly turning the wheels 179, 180, into the opposite angularly swung position. Similarly, the control arm 354 retains its vertical of centered position and pushes the steering rod 250 to the left correspondingly turning the wheels 242, 243. As a result, the trailer D will again track properly behind the rear wheels of the right-turning principal vehicle. Meanwhile, since the rear control links 331, 379, are free to shift in either direction, they will do so as the forward steering rods 187, 250, shift and will, as previously pointed out, have no effect on the rear steering rods 190, 253, or the wheels 179, 180, 242, 243.

When it is necessary or desirable to back up, the position of the switch S² is reversed and, as previously pointed out, shifts the position of the solenoid-actuated valve 122. This, in effect, applies air under pressure to the rear cylinders 325, 336, 371, 382, causing them to "center" the control links 331, 379, and lock them to the load-carrying frame 141. At the same time, the lines 406, 407, 408, are, in effect, vented to atmosphere and the forward cylinders 302, 313, 348, 359, become free to shift in either direction. The control links 308, 354, are accordingly "released" for free-swinging action, with the result that the forward steering rods 187, 250, are free and the rear steering rods 190, 253, are operative in the performance of the steering function. Consequently, the reverse sequence of steering movements will take place responsive to turning movement of the principal vehicle and the trailer D will again track properly.

It will, of course, be apparent that if the load on the load-carrying frame 141 of the trailer D is relatively light or if the diametral size, air pressure capacity, and other design parameters of the cylinders 302, 313, 325, 336, 348, 359, 371, and 382, are worked out so as to provide sufficient pneumatic force, the wheels 179, 180, 242, 243, can actually be pushed from a turned position to a straight forward position or even to an oppositely turned position merely by shifting the transmission and thereby correspondingly actuating the back-up switch S² while the principal vehicle and trailer D are standing still. Surprisingly enough, it has been found, as a matter of actual practice, that this latter result can be accomplished without requiring excessive large pneumatic equipment and, even though somewhat more costly, is nevertheless desirable inasmuch as it provides for smooth operation of commercial vehicles.

Inasmuch as frame 141 is supported at uniformly spaced intervals for its entire length, the various structural members comprising frame 141 need not be as heavy as their counterparts on conventional over-the-road trailers. Consequently, the weight saved can be devoted to additional freight.

It also should be noted in this connection that the present invention can be applied to vehicular trailers having any number of tandem axles. For instance, if the trailer has two axles rather than the three axles shown in the above-described trailer D, then the rear axle should be of the non-steering type comparable to the middle axle 282 and the dual wheel and tire units 285, 286, above described. In other words, where the vehicular trailer is equipped with two or more axles, one of them must be non-steering. In the case of a single axle trailer, such as the previously described trailer A, the rear axles of the principal vehicle A serves the function of the "fixed" or non-steering axle.

Another important advantage achieved by the present invention is the constant tendency for the load-carrying frame and the under carriages to pull back into centered alignment whenever the vehicle returns to straight-forward or straight-rearward movement. This materially reduces wear and tear on the tires.

It should be understood that changes and modifications in the form, construction, arrangement, and combination of the several parts of the vehicular trailers may be made and substituted for those herein shown and described without departing from the nature and principle of my invention.

Having thus described my invention, what I claim and desire to secure by Letters Patent is:

1. A vehicular trailer adapted to be tractively drawn by a principal vehicle; said trailer comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, and means operatively connected to the load-carrying frame and to the steerable wheels for changing the position of the wheels responsive to said lateral shifting movements of the load-carrying frame.

2. An auxiliary vehicle adapted to be operatively connected to and propelled by a principal vehicle; said auxiliary vehicle comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, and link means operatively connected to the load-carrying frame and to the steerable wheels for changing the position of the wheels responsive to said lateral shifting movements of the load-carrying frame.

3. An auxiliary vehicle adapted to be operatively connected to and propelled by a principal vehicle; said auxiliary vehicle comprising a load-carrying frame, and underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, means operatively connected to the load-carrying frame and to the steerable wheels for changing the position of the wheels responsive to said lateral shifting movements of the load-carrying frame, and means for optionally securing said last-named means to, or releasing said last-named means from, the load-carrying frame.

4. An auxiliary vehicle adapted to be operatively connected to and propelled by a principal vehicle; said auxiliary vehicle comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, means operatively connected movably at its upper end to the load-carrying frame and movably at its lower end to the steerable wheels for changing the position of the wheels responsive to said lateral shifting movements of the load-carrying frame, and means for optionally securing said last-named means to, or releasing said last-named means from, the load-carrying frame.

5. An auxiliary vehicle adapted to be operatively connected to and propelled by a principal vehicle; said auxiliary vehicle comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, first and second actuating means movably connected between the load-carrying frame and the steerable wheels, and means for alternatively rigidly connecting either the first or the second actuating means to the load-carrying frame so that when thus connected the steerable wheels will change position responsive to said lateral shifting movement of the load-carrying frame.

6. An auxiliary vehicle adapted to be operatively connected to and propelled by a principal vehicle; said auxiliary vehicle comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, first and second actuating links rockably connected between the load-carrying frame and the steerable wheels, and means for alternatively rigidly connecting either the first or the second actuating links to the load-carrying frame so that when the first actuating link is thus connected the steerable wheels will change position responsive to said lateral shifting movement of the load-carrying frame as the principal vehicle turns while going forward and so that when the second actuating link is thus connected, the steerable wheels will change position responsive to lateral shifting movement of the load-carrying frame as the principal vehicle turns while backing up.

7. An auxiliary vehicle adapted to be operatively connected to and propelled by a principal vehicle; said auxiliary vehicle comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, first and second actuating means movably connected between the load-carrying frame and the steerable wheels, and electrically actuable means for alternatively rigidly connecting either the first or the second actuating means to the load-carrying frame so that when thus connected the steerable wheels will change position responsive to said lateral shifting movement of the load-carrying frame.

8. A vehicular trailer according to claim 7 in which the electrically actuable means include in combination, fluid-pressure responsive cylinder means and a solenoid-actuated valve for controlling the flow of fluid thereto.

9. An auxiliary vehicle adapted to be operatively connected to and propelled by a principal vehicle; said auxiliary vehicle comprising a load-carrying frame, an underframe having steerable wheels, means operatively connecting the load-carrying frame and the underframe so that the load-carrying frame is supported by the underframe in such a manner that the load-carrying frame is free to shift laterally with respect to the underframe responsive to turning movements of the principal vehicle, first and second actuating means movably connected between the load-carrying frame and the steerable wheels, and fluid-pressure responsive means for alternatively rigidly connecting either the first or the second actuating means to the load-carrying frame so that when thus connected the steerable wheels will change position responsive to said lateral shifting movement of the load-carrying frame.

10. An auxiliary vehicle adapted to be tractively drawn by a principal vehicle; said auxiliary vehicle comprising a load-carrying frame, a plurality of underframes each having a set of steerable wheels, means operatively connecting the load-carrying frame and each underframe so that the load-carrying frame is supported by the underframes in such a manner that the load-carrying frame is free to shift laterally with respect to the underframes responsive to turning movements of the principal vehicle, and means operatively connected to the load-carrying frame and to each set of steerable wheels for independently changing the position of each set of wheels responsive to said lateral shifting movements of the load-carrying frame.

11. An auxiliary vehicle adapted to be tractively drawn by a principal vehicle; said auxiliary vehicle comprising a load-carrying frame, a plurality of underframes each having pneumatically supported steerable wheels, means operatively connecting the load-carrying frame and each underframe so that the load-carrying frame is supported by the underframes in such a manner that the load-carrying frame is free to shift laterally with respect to the underframes responsive to turning movements of the principal vehicle, and means operatively connected to the load-carrying frame and to each set of steerable wheels for independently changing the position of each set of wheels responsive to said lateral shifting movements of the load-carrying frame.

12. An auxiliary vehicle adapted to be tractively drawn by a principal vehicle; said auxiliary vehicle comprising a load-carrying frame, a plurality of underframes each having a set of steerable wheels, means operatively connecting the load-carrying frame and each underframe so that the load-carrying frame is supported by the underframes in such a manner that the load-carrying frame is free to shift laterally with respect to the underframes responsive to turning movements of the principal vehicle, and link means operatively connected to the load-carrying frame and to each set of steerable wheels for changing the position of each set of wheels responsive to said lateral shifting movements of the load-carrying frames.

13. An auxiliary vehicle adapted to be tractively drawn by a principal vehicle; said auxiliary vehicle comprising a load-carrying frame, a plurality of underframes each having a set of steerable wheels, means operatively connecting the load-carrying frame and each underframe so that the load-carrying frame is supported by the underframes in such a manner that the load-carrying frame is free to shift laterally with respect to the underframes responsive to turning movements of the principal vehicle, and means operatively connected at its upper end to the load-carrying frame and at its lower end to each set of steerable wheels for changing the position of each set of wheels responsive to said lateral shifting movements of the load-carrying frames.

14. An auxiliary vehicle adapted to be tractively drawn by a principal vehicle; said auxiliary vehicle comprising a load-carrying frame, a plurality of underframes each having a set of steerable wheels, means operatively connecting the load-carrying frame and each underframe so that the load-carrying frame is supported by the underframes in such a manner that the load-carrying frame is free to shift laterally with respect to the underframes responsive to turning movements of the principal vehicle, means operatively connected to the load-carrying frame and to each set of steerable wheels for changing the position of each set of wheels responsive to said lateral shifting movements of the load-carrying frames, and means for optionally securing said last named means to, or releasing said last named means from, the load-carrying frame.

15. An auxiliary vehicle adapted to be tractively drawn by a principal vehicle; said auxiliary vehicle comprising a load-carrying frame, a plurality of underframes each having a set of steerable wheels, means operatively connecting the load-carrying frame and each underframe so that the load-carrying frame is supported by the underframes in such a manner that the load-carrying frame is free to shift laterally with respect to the underframes responsive to turning movements of the principal vehicle, first and second actuating links rockably connected between the load-carrying frame and the steerable wheels, and means for alternatively rigidly connecting either the first or the second actuating means to the load-carrying frame so that when thus connected the steerable wheels will change position responsive to said lateral shifting movement of the load-carrying frame.

References Cited by the Examiner

UNITED STATES PATENTS

| 2,643,895 | 6/1953 | Stover | 280—81 |
| 2,690,916 | 10/1954 | Gilliam | 280—81 |
| 2,848,244 | 8/1958 | Georgi | 280—81 |
| 2,851,280 | 9/1958 | Matteazzi | 280—81 |
| 3,044,795 | 7/1962 | Standing et al. | 280—81 |

LEO FRIAGLIA, *Primary Examiner.*